United States Patent
Brownmiller et al.

[11] Patent Number: 5,864,608
[45] Date of Patent: Jan. 26, 1999

[54] SYSTEM AND METHOD FOR FORMATTING PERFORMANCE DATA IN A TELECOMMUNICATIONS SYSTEM

[75] Inventors: Curtis Brownmiller, Richardson; Mike Bencheck, Garland; Minh Tran, Plano; Robert Branton, Farmers Branch; Mark DeMoss, The Colony; Steve Landon, Richardson, all of Tex.

[73] Assignee: MCI Communications Corporation, Washington, D.C.

[21] Appl. No.: 670,905

[22] Filed: Jun. 26, 1996

[51] Int. Cl.$^6$ .................................................. H04M 15/00
[52] U.S. Cl. .......................... 379/113; 379/133; 379/219; 379/229; 370/248; 370/351
[58] Field of Search ..................................... 379/111, 112, 379/113, 121, 133, 141, 154, 191, 196, 197, 207, 230, 242, 244, 335, 271, 306, 310, 219, 220, 221, 222, 229; 370/248, 250, 351, 352

[56] References Cited

U.S. PATENT DOCUMENTS

| | | | |
|---|---|---|---|
| 4,937,825 | 6/1990 | Ballard et al. | 371/20.1 |
| 5,001,706 | 3/1991 | Dighe et al. | |
| 5,020,054 | 5/1991 | May, Jr. | |
| 5,157,667 | 10/1992 | Carusone, Jr. et al. | 371/29.1 |
| 5,189,674 | 2/1993 | Shimizu | 370/20.1 |
| 5,233,600 | 8/1993 | Pekarske | 370/14 |
| 5,268,903 | 12/1993 | Jones et al. | |
| 5,299,201 | 3/1994 | Carusone, Jr. et al. | 371/51 |
| 5,412,652 | 5/1995 | Lu | 370/85.12 |
| 5,416,768 | 5/1995 | Jahromi | |
| 5,436,909 | 7/1995 | Dev et al. | 371/20.1 |
| 5,452,306 | 9/1995 | Turudic et al. | 370/110.1 |
| 5,455,832 | 10/1995 | Bowmaster | 371/20.1 |
| 5,463,634 | 10/1995 | Smith et al. | 371/20.6 |
| 5,483,520 | 1/1996 | Eychenne et al. | 370/16.1 |
| 5,566,162 | 10/1996 | Gruber et al. | 370/13 |

OTHER PUBLICATIONS

Banerjee et al., "ISDN Primary Rare Access Maintenance," IEEE, 1989, pp. 2.6.1–2.6.5.

Cadieux et al., "A New Network Element for Performance Monitoring and Test Access Spanning the Digital Hierarchy," IEEE, 1990, pp. 324.4.1–334.4.5.

Kerschberg et al., "Intelligent Network Management: A Heterogeneous Knowledge Source Approach," IEEE, 1990, pp. 314–316.

Mageed et al., "Fault Detection and Indentification Using a Hierarchical Neural Network–Based System, " IEEE, 1993, pp. 338–343.

*Primary Examiner*—Curtis A. Kuntz
*Assistant Examiner*—Binh K. Tieu

[57] ABSTRACT

A system and method for processing performance data in a telecommunication system. The system includes a site controller which is part of an element management layer of a network management hierarchy. Briefly stated, the site controller receives performance data from a network element. The performance data is associated with a plurality of ports of the network element. The network element is part of a network element layer of the network management hierarchy. The site controller selects a first port of the network element to process. The site controller determines whether the first port is cross-connected to a second port of the network element. If the first port is cross-connected to the second port, then the site controller combines performance data associated with the first port and performance data associated with the second port into a performance report. The site controller forwards the performance report to a monitoring module. The monitoring module is part of a network management layer and/or a service management layer of the network management hierarchy.

21 Claims, 5 Drawing Sheets

SYSTEM AND METHOD FOR FORMATTING PERFORMANCE DATA IN A TELECOMMUNICATIONS SYSTEM

BACKGROUND OF THE INVENTION

1. Field of the Invention

The present invention relates generally to network management in a telecommunications system, and more particularly to network management functions pertaining to formatting and delivering performance data to higher layers in the network management hierarchy.

2. Related Art

FIG. 2 is a block diagram of a portion of a conventional telecommunications environment 202. The telecommunications environment 202 includes a first customer premises 204 and a second customer premises 208. The first customer premises 204 and the second customer premises 208 are preferably DS1 facilities. A DS1 facility is a telecommunications facility that transmits and receives DS1 data. DS stands for digital stream. DS1 is a circuit format having a rate of 1.544 Mbps.

If the first customer premises 204 and the second customer premises 208 are DS1 facilities, then they preferably operate according to the Extended SuperFrame (ESF) framing format. The ESF framing format provides a data channel through which performance data may be transmitted. Such performance data includes data relating to code violations and errors. The ESF framing format is well known.

The first customer premises 204 and the second customer premises 208 are connected to a long distance carrier 206 (for ease of illustration, many conventional components are not shown in FIG. 2, such as local exchange companies). More particularly, the first customer premises 204 and the second customer premises 208 are connected to conventional extended super frame monitoring units (ESFMU) 214, 226. The ESFMUs 214, 226 are connected to a long distance telephone network 224.

Each ESFMU, such as ESFMU 214, includes a west side 216 and an east side 218. The east side 218 is defined to be the side that is closest to the network 224. The west side 216 includes a port 250 and the east side 218 includes a port 256. The west side port 250 includes a receive portion 252 and a transmit portion 254. Similarly, the east side port 256 includes a receive portion 260 and a transmit portion 258.

The west side port 250 is cross-connected to the east side port 256. Specifically, the receive portion 252 of the west side port 250 is connected to the transmit portion 258 of the east side port 256. Also, the transmit portion 254 of the west side port 250 is connected to the receive portion 260 of the east side port 256.

Two cross-connected ports are said to be part of a bi-directional link. Thus, in the ESFMU 214, the west side port 250 and the east side port 256 are part of a bi-directional link.

The ESFMU 214 monitors and collects performance data from DS1 facilities that are operating according to the ESF framing format. Specifically, the ESFMU 214 monitors and collects performance data pertaining to the traffic received by the receive portion 252 of the west side port 250 and the receive portion 260 of the east side port 256.

The ESFMU 214 packages the performance data pertaining to two cross-connected ports into a single performance report. In particular, the ESFMU 214 places into a single performance report the performance data collected by the receive portion 252 of the west side port 250 and the performance data collected by the receive portion 260 of the east side port 256. In other words, the performance reports generated by the ESFMU 214 each corresponds to a bi-directional link.

The ESFMU 214 sends the performance report to a site controller 210. The site controller 210 forwards the performance report to a monitoring module 212.

It is important that the performance reports generated by the ESFMUs 214, 226 each include performance data pertaining to two cross-connected ports. In other words, it is important that the performance reports generated by the ESFMUs 214, 226 each include performance data pertaining to a bi-directional link. The monitoring module 212 expects to receive performance reports in this format. It would be necessary to substantially modify the monitoring module 212 if the performance reports were not in this format (i.e., if the performance reports did not each include performance data pertaining to two cross-connected ports).

The ESFMUs 214, 226, the site controller 210, and the monitoring module 212 represent components in a network management hierarchy. The ESFMUs 214, 226 are within a network element layer of the network management hierarchy. The site controller 210 is within an element manager layer of the network management hierarchy. The monitoring module 212 performs functions associated with a network management layer and a service management layer of the network management hierarchy.

The above description of the conventional telecommunications environment 202 shall now be restated in terms of the network management hierarchy. Specifically, in the conventional telecommunications environment 202 of FIG. 2, network elements (i.e., the ESFMUs 214, 226) in the element manager layer generate performance reports. Each performance report includes performance data pertaining to two cross-connected ports. That is, each performance report includes performance data pertaining to a bi-directional link. The performance reports are forwarded to element(s) (i.e., the monitoring module 212) in the network management layer/service management layer. These elements in the network management layer/service management layer expect to receive performance reports in this format (i.e., where each performance report includes performance data pertaining to a bi-directional link). It would be necessary to substantially modify these elements in the network management layer/service management layer if the performance reports were not in this format.

There are other types of network elements (other than ESFMUs) that are within the control of the element manager layer. Not all of these network elements in the element manager layer generate performance reports where each performance report includes performance data pertaining to two cross-connected ports (i.e., pertaining to a bi-directional link). When such network elements are used, significant modifications to the elements in the network management layer/service management layer are typically required. The need to make such modifications to the elements in the network management layer/service management layer places a great burden on the long distance carrier.

SUMMARY OF THE INVENTION

The present invention is directed to a system and method for processing performance data in a telecommunication system. The system includes a site controller which is part of an element management layer of a network management hierarchy.

Briefly stated, the site controller receives performance data from a network element. The performance data is associated with a plurality of ports of the network element. The network element is part of a network element layer of the network management hierarchy.

The site controller selects a first port of the network element to process. The site controller determines whether the first port is cross-connected to a second port of the network element. If the first port is cross-connected to the second port, then the site controller combines performance data associated with the first port and performance data associated with the second port into a performance report. The site controller forwards the performance report to a monitoring module. The monitoring module is part of a network management layer and/or a service management layer of the network management hierarchy.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
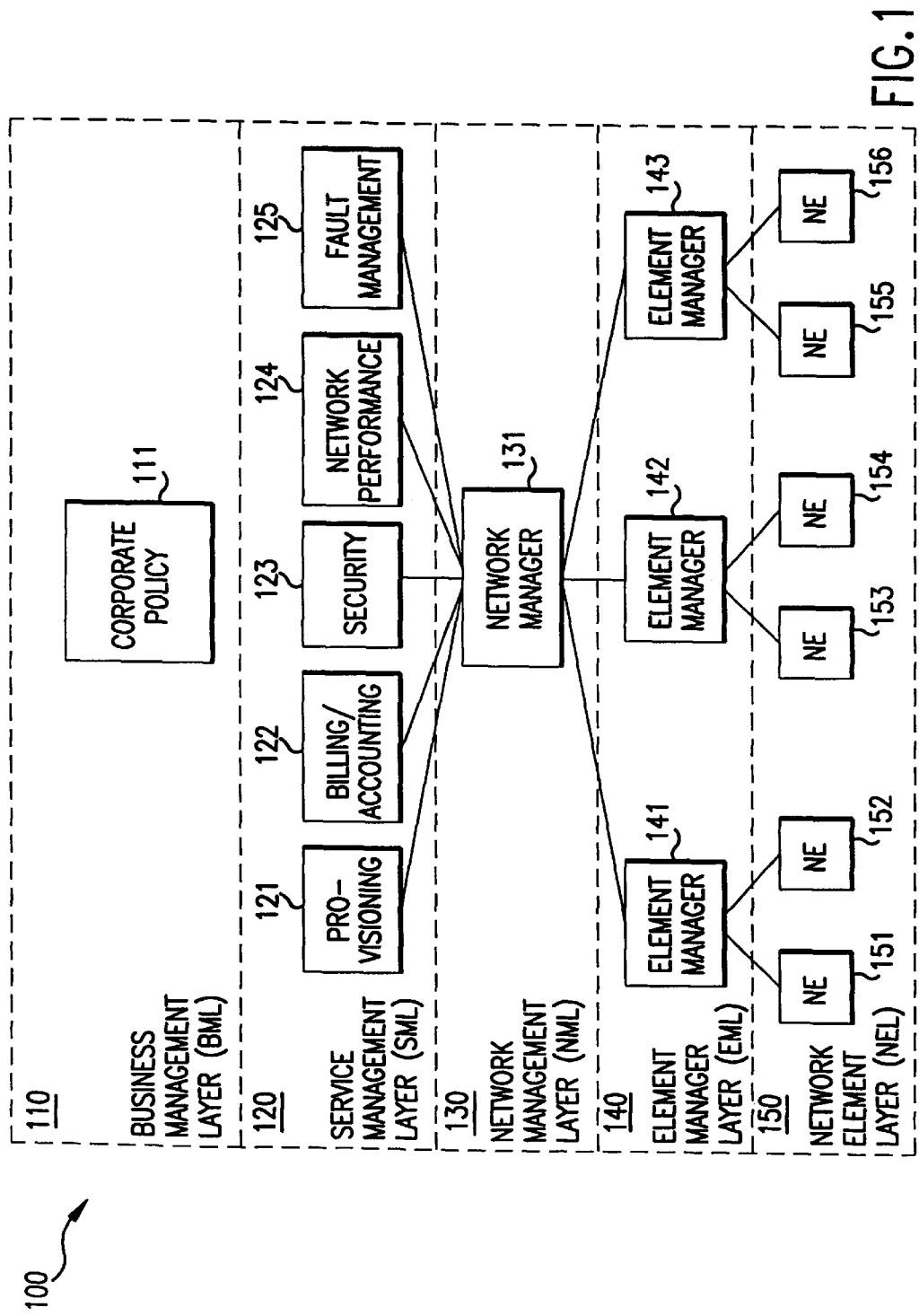
FIG. 1 illustrates a network management system (hierarchy)

FIG. 1 illustrates a network management hierarchy or system 100. The network management system 100 preferably complies with the international telecommunications union (ITU) telecommunications management network (TMN) standard. The TMN standard defines a layered framework for a service provider to implement its own network management process.

The network management system 100 includes five layers 110, 120, 130, 140 and 150. Layer 150 is designated as the network element layer (NEL). The NEL is a physical layer that includes the various network elements (e.g., asynchronous systems, SONET systems, etc.) used in the transport and routing of network traffic (e.g., DS1, DS3, OC-N, etc.). Each network element 151–156 in NEL 150 can be designed to provide performance monitoring, alarm and status information to the higher network management layers 110, 120, 130 and 140. In particular, network elements 151–156 are connected to one of the element managers 141–143 in element manager layer (EML) 140. For example, network elements 151 and 152 are connected to element manager 141. In this manner, each network element manager 141–143 controls a portion of the physical network embodied as NEL 150.

Element managers 141–143 can retrieve information from network elements 151–156 periodically by a polling method. Alternatively, network elements 151–156 can be programmed to provide element managers 141–143 with a predefined subset of network management information at predefined time intervals. The domain of an element manager 141–143 can be defined by the vendor. In some situations, the domain of an element manager 141–143 can be dictated by the geography in which network elements 151–156 reside.

After network management information is acquired by element managers 141–143 from network elements 151–156, it is forwarded (either as a whole or in part) to network management layer (NML) 130. NML 130 comprises network manager 131. Network manager 131 is logically shown as a single entity. In implementation, network manager 131 can comprise one or more sites. For example, multiple service centers can exist at different parts (e.g., east coast and west coast) of the country. In combination, these national-level service centers combine to provide total visibility of the physical network in NEL 150. Network manager 131 can also be split among services and/or network elements. For example, in one embodiment, a first network manager is dedicated to asynchronous parts of the network, a second network manager is dedicated to DS1, DS3 and VT-n traffic, and a third network manager is dedicated to STS-n and OC-n traffic.

Generally, the logical entity identified as network manager 131 is a resource that is accessed by applications in service management layer (SML) 120. In FIG. 1, SML 120 is shown to include five applications 121–125. Specifically, SML 120 includes provisioning application 121, accounting/billing application 122, security application 123, network performance application 124, and fault management application 125 (it is noted that these applications are also in the NML 130). This listing of applications is provided without limitation. Any other applications that utilizes network management data that originates in NEL 150 can also be included.

Network management system 100 also includes business management layer (BML) 110. BML 100 includes a logical entity 111 that represents the general corporate policy of network management system 100. Corporate policy 111 dictates the general business and contractual arrangements of the service provider.

Figure 3:
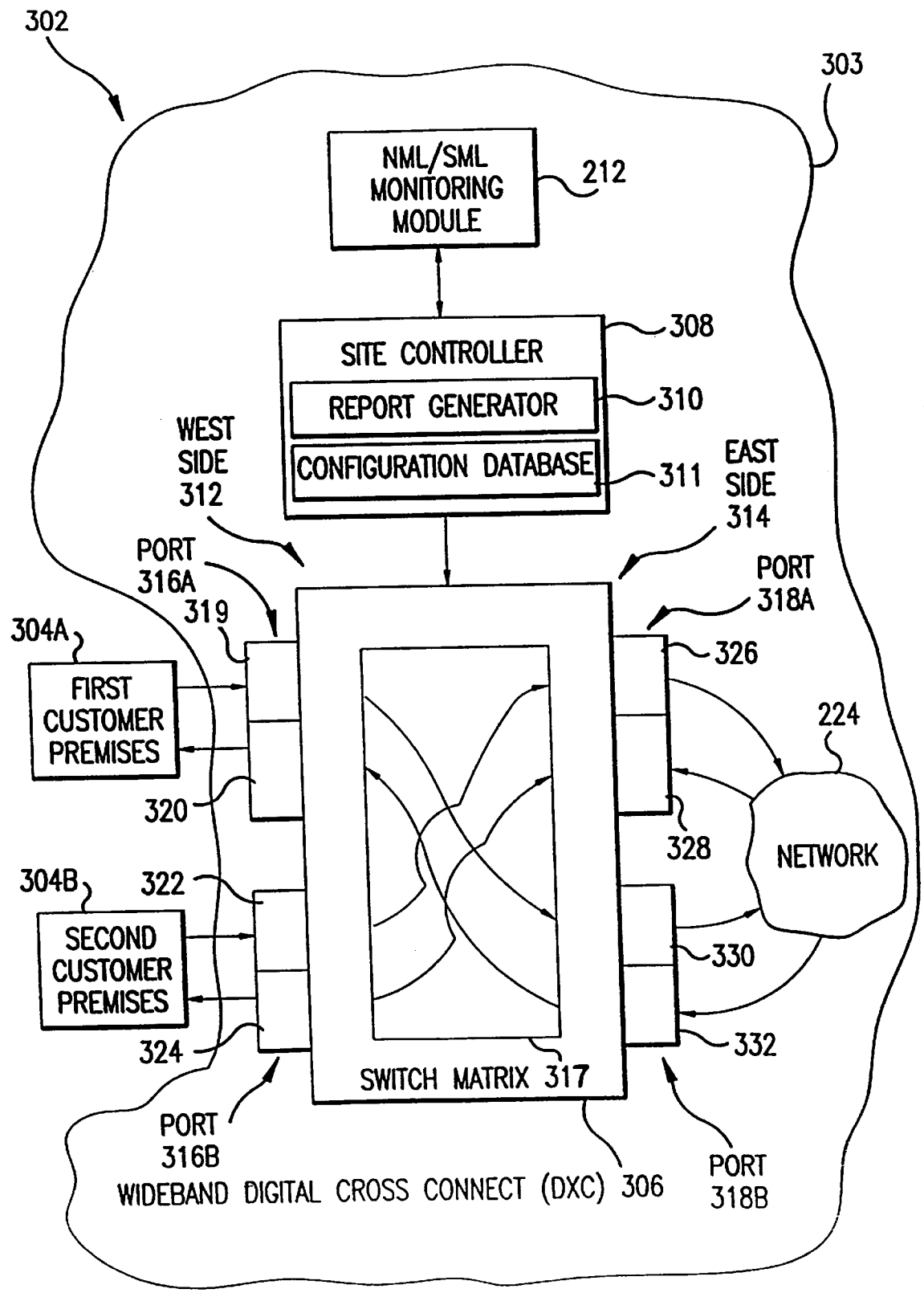
FIG. 3 is a block diagram of a telecommunication system according to a preferred embodiment of the invention.

FIG. 3 is a block diagram of a portion of a telecommunications environment 302 according to a preferred embodiment of the present invention. As apparent from the following description, the telecommunications environment 302 preferably conforms to the conventions of the network management system 100 shown in FIG. 1.

The telecommunications environment 302 includes a first customer premises 304A and a second customer premises 304B. The first customer premises 304A and the second customer premises 304B are preferably DS1 facilities. A DS1 facility is a telecommunications facility that transmits and receives DS1 data. DS stands for digital stream. DS1 is a circuit format having a rate of 1.544 Mbps. It is noted that the present invention is not limited to use with DS1, but can accommodate other circuit formats.

If they are DS1 facilities, then the first customer premises 304A and the second customer premises 304B preferably operate according to the Extended SuperFrame (ESF) framing format. The ESF framing format provides a data channel through which performance data may be transmitted. Such performance data includes data relating to code violations and errors. The ESF framing format is well known. It is noted that the present invention is not limited to use with ESF, but can accommodate other framing formats.

The first customer premises 304A and the second customer premises 304B are connected to a long distance carrier 303. Only a portion of the long distance carrier 303 is shown in FIG. 3. Also, many conventional components are not shown in FIG. 3, such as components associated with local exchange companies.

More particularly, the first customer premises 304A and the second customer premises 304B are connected to a network element that forms part of the long distance carrier 303. The network element is in the network element layer 150. Preferably, the network element is a wideband digital cross connect (DXC) 306. The DXC 306 is connected to a long distance communication network 224.

The DXC 306 includes a west side 312 and an east side 314. The east side 314 is defined to be the side that is closest to the network 224. The west side 312 includes a plurality of ports 316. The east side 314 also includes a plurality of ports 318. Each of the ports 316, 318, such as port 316A, includes a receive portion 319 and a transmit portion 320.

The DXC 306 also includes a switch matrix 317. The DXC 306 operates to connect west side ports 316 to east side ports 318 via the switch matrix 317. Such connections are preferably one-to-one (i.e., one west side port 316 is connected to one east side port 318, and vice versa).

In the example of FIG. 3, west side port 316A is connected to east side port 318B. Specifically, the receive portion 319 of the west side port 316A is connected to the transmit portion 330 of the east side port 318B, and the transmit portion 320 of the west side port 316A is connected to the receive portion 332 of the east side port 318B.

A pair of ports (i.e., an east side port and a west side port) connected to one another via the switch matrix 317 are called cross-connected ports. Cross-connected ports (such as west side port 316A and east side port 318B) form part of a bi-directional link. For example, cross-connected ports 316A and 318B form part of a bi-directional link that includes the first customer premises 304A and the network 224.

The DXC 306 monitors and collects performance data from preferably DS1 facilities that are preferably operating according to the ESF framing format. (However, the invention is not limited to DS1 and ESF.) Specifically, the DXC 306 monitors and collects performance data pertaining to the traffic received by the receive portions 319, 322, 328,332 of the ports 316,319 on the west side 312 and the east side 314. The DXC 306 forwards such performance data to a site controller 308.

Figure 2:
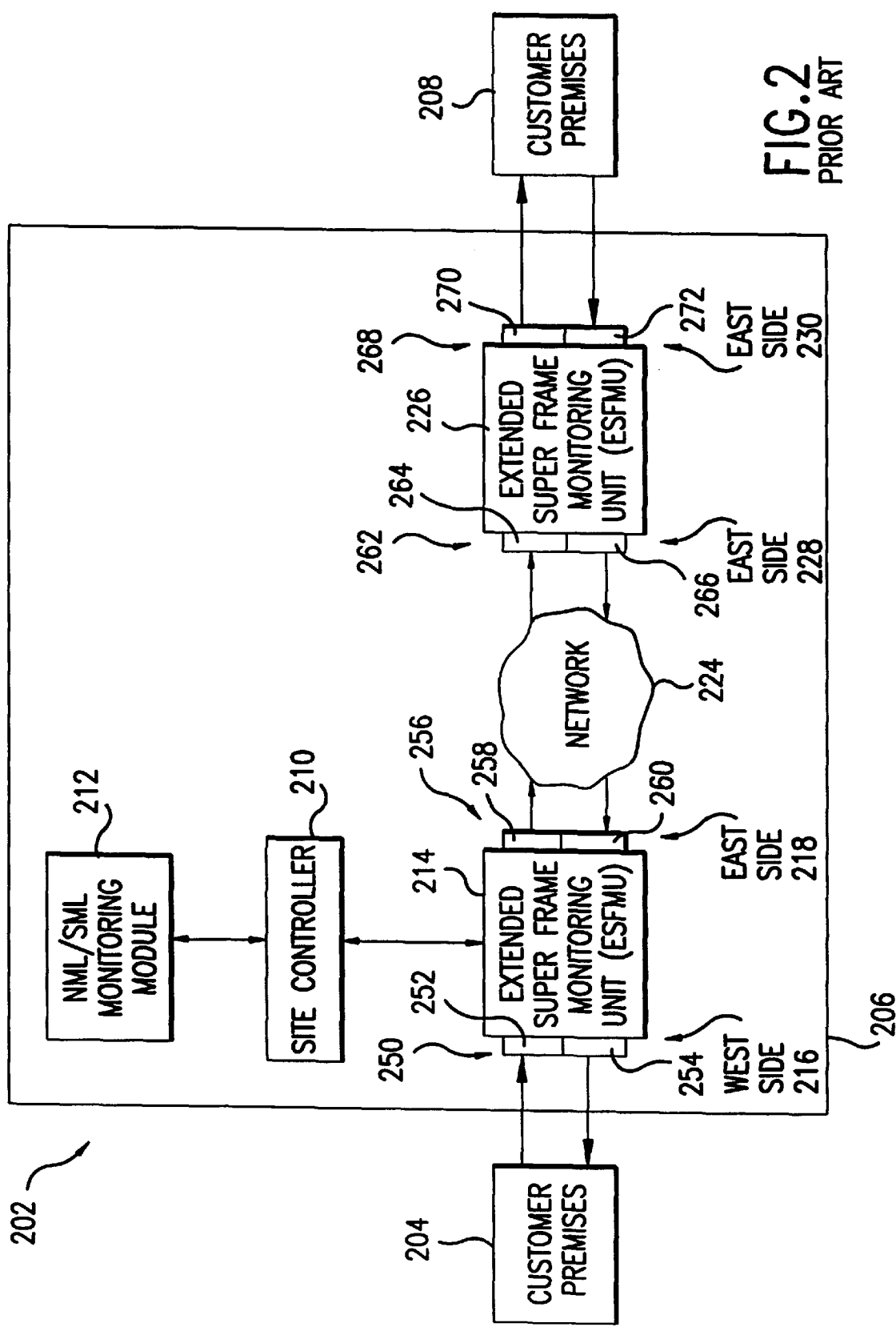
FIG. 2 is a block diagram of a conventional telecommunication system.

Unlike the conventional ESFMUs 214, 226 (FIG. 2), the DXC 306 does not package the performance data on a cross-connected port or bi-directional link basis. That is, the DXC 306 does not package performance data collected by cross-connected ports together into a single performance report. For example, the DXC 306 does not package together performance data collected by the receive portions 319 and 332 of cross-connected ports 316A and 318B into a single performance report. Instead, the DXC 306 sends the performance data collected by its ports 316, 318 in an unpackaged form to the site controller 308. This unpackaged form does not correlate the performance data collected by cross-connected ports of the DXC 306, such as cross-connected ports 316A and 318B and cross-connected ports 316B and 318A.

As noted above, the DXC 306 forwards the unpackaged performance reports to the site controller 308, which is part of the long distance carrier 303. The site controller 308 represents an element manager (such as element managers 141, 142, 143) in the element management layer 140. The site controller 308 processes the unpackaged performance reports and sends the processed performance reports to a monitoring module 212.

The monitoring module 212 is part of the long distance carrier 303. The monitoring module 212 performs functions that are associated with the network management layer 130 and the service management layer 120. Accordingly, the monitoring module 212 can be viewed as being in both the network management layer 130 and the service management layer 120.

The monitoring module 212 expects to receive performance data that has been packaged in a particular way. Specifically, the monitoring module 212 expects to receive performance data that has been packaged on a cross-connected port or bi-directional link basis. More particularly, the monitoring module 212 expects to receive performance reports in which the performance data collected by cross-connected ports, such as cross-connected ports 316A and 318B, has been packaged together.

As noted above, however, the DXC 306 does not package the performance data on a cross-connected port or bi-directional link basis. In other words, in the present invention, packaging of the performance data on a cross-connected port or bi-directional link basis is not performed by the network element layer 150.

Instead, according to the present invention, packaging of the performance data on a cross-connected port or bi-directional link basis is performed by the element manager layer 140. In particular, packaging of the performance data on a cross-connected port or bi-directional link basis is performed by the site controller 308. Accordingly, the site controller 308 receives unpackaged and uncorrelated performance data from the DXC 306. A report generator 310 in the site controller 308 packages the received performance data on a cross-connected port or bi-directional link basis, and then forwards the packaged performance data to the monitoring module 212.

The site controller 308 is described herein with respect to use with the DXC 306. However, the invention is not limited to this embodiment. Instead, the advantages of the present invention can be achieved by using the site controller 308 with any network element 151–156 in the network element layer 150 that does not package and/or correlate performance data on a cross-connected port or bi-directional link basis.

Figure 4:
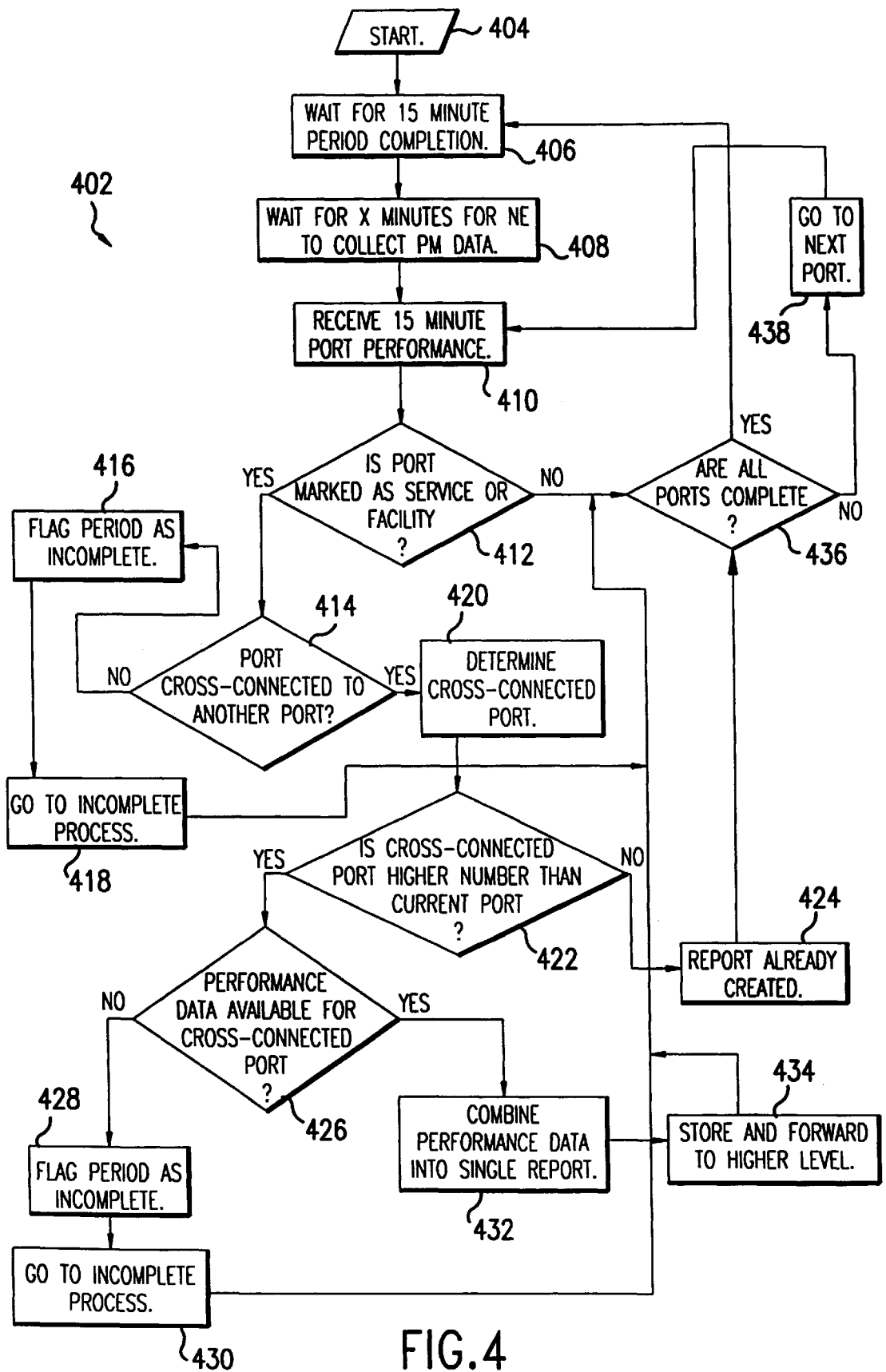
FIG. 4 is a flowchart representing the preferred operation of the invention.

The operation of the site controller 308 shall now be described in detail with reference to a flowchart 402 in FIG. 4. Flowchart 402 begins with step 404, where control immediately passes to step 406.

In step 406, the site controller 308 waits for a first predetermined time period to elapse. At the end of this first predetermined time period, control flows to step 408 where the process begins for collecting performance data from network elements 151–156, such as the DXC 306. The first predetermined time period is preferably 15 minutes. Thus, the site controller 308 preferably collects performance data from the DXC 306 and other network elements 151–156 once every 15 minutes. It is noted that the invention is not limited to this value of 15 minutes. Instead, the first predetermined time period can be adjusted to reflect the number of times that one wishes to collect performance data during the course of a day. For example, if one wishes to collect performance data 24 times a day, then the first predetermined time period would be set to 60 minutes. The value of the first predetermined time period may depend on the operation of the DXC 306, i.e., how often the DXC 306 is capable of sending performance data to the site controller 308.

In step 408, the site controller 308 queries the DXC 306 for performance data. This query is not necessary for all network elements 151–156, because some network elements 151–156 (including some embodiments of the DXC 306) automatically provide the performance data to the site controller 308.

Also in step 408, the site controller 308 waits for a second predetermined time period. The second predetermined time period is set equal to a value that corresponds to the amount of time that the network elements 151–156 need to process and send the performance data to the site controller 308. As such, the value of the second predetermined time period is implementation dependent. For the DXC 306, the second predetermined time period is typically set to 7–10 minutes but, again, this depends on the implementation of the DXC 306.

In step 410, the site controller 308 receives performance data from the DXC 306. Such performance data preferably includes performance data (if any) collected by all of the ports 316, 318 of the DXC 306. As noted above, such performance data is not packaged on a cross-connected port or bidirectional link basis.

The site controller 308 has available to it information regarding the configuration of the network elements 151–156, such as the DXC 306. Such configuration information includes information indicating whether or not a port 316, 318 of the DXC 306 is part of a bidirectional link that is being monitored. Ports that are part of bi-directional links that are being monitored are generally called service or facility ports. Such configuration information also includes information that indicates whether a port is cross-connected to another port. Such configuration information further includes information that identifies, for each cross-connected port, the port to which it is cross-connected. In one embodiment, such configuration information is stored in a configuration database 311 within the site controller 308. In another embodiment, such configuration information is stored external to the site controller 308, and the site controller 308 has access to the externally stored configuration information.

In step 412, the site controller 308 selects a port of the DXC 306 to analyze. For example, suppose that the site controller 308 selects port 316A. It is noted that each port 316, 318 is assigned a numerical identifier. For illustrative purposes, assume that the identifier of port 316A is 1, the identifier of port 316B is 2, the identifier of port 318A is 3, and the identifier of port 318B is 4. The ports 316, 318 are preferably selected for processing in ascending order by their identifiers, such that ports assigned identifiers 1, 2, 3, 4, 5, etc., are sequentially selected.

Also in step 412, the site controller 308 determines whether the selected port 316A is a service or facility port. If the selected port 316A is not a service or facility port, then no performance data exists for the selected port 316A (since, by definition, a non-service or facility port is not part of a bi-directional link that is being monitored). In this case, step 436 is performed.

In step 436, the site controller 308 determines whether all ports 316, 318 of the DXC 306 have been processed. If all ports 316, 318 have been processed, then control flows to step 406. If all ports 316, 318 have not been processed, then the site controller 308 in step 438 selects the port 316, 318 with the next highest numerical identifier to process. Control then flows to step 410.

Returning to step 412, if the site controller 308 determines that the selected port 316A is a service or facility port, then step 414 is performed. It is noted that such ports should have performance data associated with them, since they are part of a bi-directional link that is being monitored.

In step 414, the site controller 308 accesses the configuration database 311 to determine whether the selected port 316A is cross-connected to another port of the DXC 306. If the configuration information in the configuration database 311 indicates that the selected port 316A is not cross-connected to another port of the DXC 306, then step 416 is performed.

In step 416, the site controller 308 sets a flag to indicate that incomplete data was received from the DXC 306 in step 410. Recall that step 416 is performed only if (1) the selected port 316A was identified as being a service or facility port; and (2) the selected port 316A was identified as not being cross-connected to another port of the DXC 306. These two conditions (1) and (2) are conflicting, since a port would not be a service or facility port unless it was cross-connected to another port. Accordingly, the fact that conditions (1) and (2) exist indicates that a mishap has occurred regarding the link that involves the selected port 316A. This mishap may include a failed communication line in the network 224, a fault in the switch matrix 316 of the DXC 306, etc. The flag that the site controller 308 sets in step 416 is an indicator that something is amiss with the link that involves the selected port 316A.

In step 418, the site controller 308 performs an "incomplete" process. During the incomplete process, the problem identified in step 414 and 416 is addressed. The details of the incomplete process are implementation specific. In some cases, diagnostics may be initiated to identify the cause of the problem. In other cases, a determination may be made to do nothing at the present time. Following step 418, control flows to step 436, described above.

Returning to step 414, if the site controller 308 determines that the selected port 316A is cross-connected to another port, then step 420 is performed.

In step 420, the site controller 308 accesses the configuration database 311 to identify the port to which the selected port 316A is cross-connected. In the current example, the site controller 308 determines that port 318B is cross-connected to the selected port 316A.

In step 422, the site controller 308 determines whether the numerical identifier of the cross-connected port is greater than the numerical identifier of the selected port. In the current example, the selected port is port 316A that has a numerical identifier of 1. The cross-connected port is port 318B that has a numerical identifier of 4. Thus, in the current example, the numerical identifier of the cross-connected port 318B is greater than the numerical identifier of the selected port 316A.

If the numerical identifier of the cross-connected port 318B is greater than the numerical identifier of the selected port 316A, then the site controller 308 has not yet processed the cross-connected port (since ports are processed in ascending order by their numerical identifiers). Thus, it is necessary to further process the selected port 316A and the cross-connected port 318B. Accordingly, control flows to step 426 (described below). If, instead, the numerical identifier of the cross-connected port 318B is less than the numerical identifier of the selected port 316A, then the site controller 308 has previously processed the cross-connected port. Accordingly, the site controller 308 determines in step 424 that a performance report for the selected port and the cross-connected port has previously been generated. Control then flows to step 436, described above.

In step 426, the site controller 308 determines whether performance data exists for the selected port 316A and the cross-connected port 318B. Such performance data would have been received by the site controller 308 in step 410. If performance data is not available for either the selected port 316A or the cross-connected port 318B, then the site controller 308 flags the performance data received from the DXC 306 as being incomplete (step 428), and performs the incomplete process (step 430). Steps 428 and 430 are similar to steps 416 and 418, respectively. Control then flows to step 436, described above.

If, in step 426, the site controller 308 determines that performance data exists for the selected port 316A and the cross-connected port 318B, then step 432 is performed. In step 432, the site controller 308 combines the performance data for the selected port 316A and the performance data for the cross-connected port 318B into a single performance report. In step 434, the site controller 308 forwards this performance report to the monitoring module 212. Control then flows to step 436 (described above).

Figure 5:
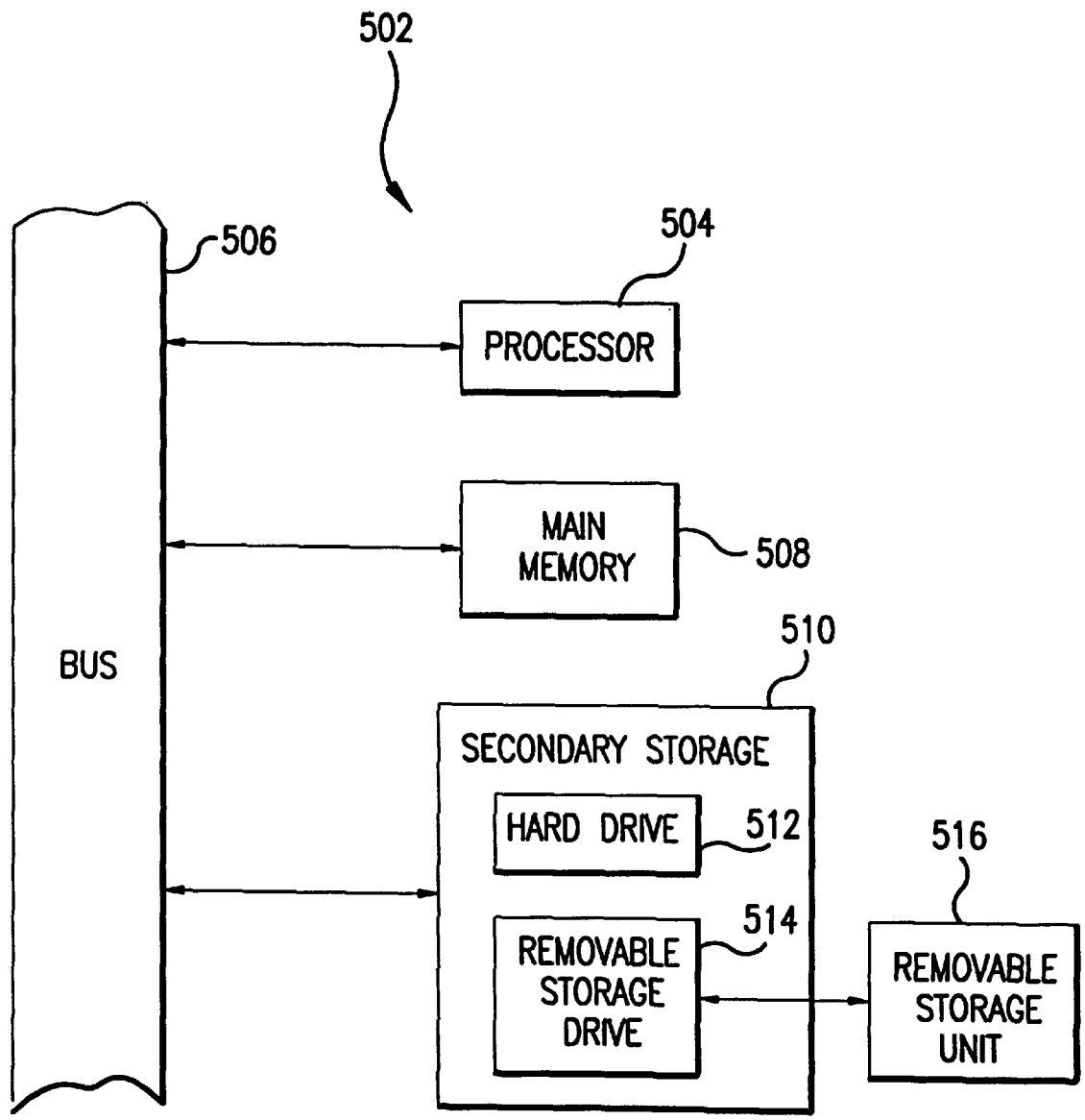
FIG. 5 is a block diagram of computer structure useful for implementing components of the invention.

Components of the invention, such as the report generator 310 and/or the site controller 308, are preferably implemented using at least computer structure 502 shown in FIG. 5. The computer structure 502 includes one or more processors, such as processor 504. The processor 504 is connected to a communication bus 506.

The computer structure 502 also includes a main memory 508, preferably random access memory (RAM), and a secondary memory (storage) 510. The secondary memory 510 includes, for example, a hard disk drive 512 and/or a removable storage drive 514, representing a floppy disk drive, a magnetic tape drive, a compact disk drive, etc. The removable storage drive 514 reads from and/or writes to a removable storage unit 516 in a well known manner.

Removable storage unit 516, also called a program storage device or a computer program product, represents a floppy disk, magnetic tape, compact disk, etc. As will be appreciated, the removable storage unit 516 includes a computer usable storage medium having stored therein computer software and/or data.

Computer programs (also called computer control logic) are stored in main memory 508 and/or the secondary memory 510. Such computer programs, when executed, enable the computer structure 502 to perform the features of the present invention as discussed herein. In particular, the computer programs, when executed, enable the processor 504 to perform the features of the present invention. Accordingly, such computer programs represent controllers of the computer structure 502.

In another embodiment, the invention is directed to a computer program product comprising a computer readable medium having control logic (computer software) stored therein. The control logic, when executed by the processor 504, causes the processor 504 to perform the functions of the invention as described herein.

In another embodiment, components of the invention are implemented primarily in hardware using, for example, a hardware state machine. Implementation of the hardware state machine so as to perform the functions described herein will be apparent to persons skilled in the relevant art(s).

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of processing performance data, comprising the steps of:
    (1) receiving a plurality of performance data from a network element, each of the performance data associated with one of a plurality of ports of the network element;
    (2) selecting a first port of the network element to process;
    (3) determining whether the first port is cross-connected to a second port of the network element;
    (4) if the first port is cross-connected to the second port, then combining performance data associated with the first port and performance data associated with the second port into a performance report; and
    (5) forwarding the performance report to a higher network management layer.

2. The method of claim 1, wherein the network element is part of a network element layer of a network management hierarchy, and the higher network management layer is at least a network management layer of the network management hierarchy.

3. The method of claim 2, wherein steps (2)–(4) are performed by a site controller that is part of an element management layer of the network management hierarchy.

4. The method of claim 1, further comprising the following steps that are performed between steps (2) and (3):
    (6) determining whether the first port is a service or facility port;
    (7) performing steps (3)–(5) if the first port is a service or facility port.

5. The method of claim 4, further comprising the following step that is performed between steps (3) and (4):
    (8) if the first port is not cross-connected to the second port, then flagging the performance data received from the network element as being incomplete, and performing an incomplete process to address problems associated with the receipt of incomplete performance data from the network element.

6. The method of claim 1, wherein step (4) comprises the steps of:
    (a) if the first port is cross-connected to the second port, then determining whether a numerical identifier of the second port is greater than a numerical identifier of the first port;
    (b) if the numerical identifier of the second port is greater than the numerical identifier of the first port, then determining whether performance data exists for both the first port and the second port; and
    (c) if performance data exists for both the first port and the second port, then combining the performance data associated with the first port and the performance data associated with the second port into the performance report.

7. The method of claim 6, wherein step (4) further comprises the following step that is performed between steps (a) and (b):
    (d) if the numerical identifier of the second port is less than the numerical identifier of the first port, then determining that a report for the first port and the second port has previously been generated.

8. The method of claim 6, wherein step (4) further comprises the following step that is performed after step (c):

(d) if performance data does not exist for both the first port and the second port, then flagging the performance data received from the network element as being incomplete, and performing an incomplete process to address problems associated with the receipt of incomplete performance data from the network element.

9. A telecommunications system, comprising:

a network element;

a site controller coupled to said network element;

a monitoring module coupled to said site controller;

wherein said site controller comprises:

performance data receiving means for receiving a plurality of performance data from said network element, each of the performance data associated with one of a plurality of ports of said network element;

port selecting means for selecting a first port of said network element to process;

cross-connection determining means for determining whether the first port is cross-connected to a second port of said network element;

report generation means for combining performance data associated with said first port and performance data associated with said second port into a performance report if said first port is cross-connected to said second port; and report forwarding means for forwarding the performance report to said monitoring module.

10. The telecommunications system of claim 9, further comprising:

a network management hierarchy wherein said network element is part of a network element layer of said network management hierarchy, said site controller is part of an element management layer of said network management hierarchy, and said monitoring module is part of at least a network management layer of said network management hierarchy.

11. The telecommunications system of claim 9, wherein said report generation means comprises:

means for determining whether a numerical identifier of the second port is greater than a numerical identifier of the first port if the first port is cross-connected to the second port;

means for determining whether performance data exists for both the first port and the second port if the numerical identifier of the second port is greater than the numerical identifier of the first port; and means for combining the performance data associated with the first port and the performance data associated with the second port into the performance report if performance data exists for both the first port and the second port.

12. The telecommunications system of claim 11, wherein said report generation means further comprises:

means for determining that a report for the first port and the second port has previously been generated if the numerical identifier of the second port is less than the numerical identifier of the first port.

13. The telecommunications system of claim 11, wherein said report generation means further comprises:

means for flagging the performance data received from the network element as being incomplete, and performing an incomplete process to address problems associated with the receipt of incomplete performance data from the network element, if performance data does not exist for both the first port and the second port.

14. A site controller, comprising:

performance data receiving means for receiving a plurality of performance data from a network element, each of the performance data associated with one of a plurality of ports of the network element;

port selecting means for selecting a first port of the network element to process;

cross-connection determining means for determining whether the first port is cross-connected to a second port of the network element;

report generation means for combining performance data associated with the first port and performance data associated with the second port into a performance report if the first port is cross-connected to the second port; and report forwarding means for forwarding the performance report to a monitoring module.

15. The site controller of claim 14, wherein the network element is part of a network element layer of a network management hierarchy, said site controller is part of an element management layer of the network management hierarchy, and the monitoring module is part of at least a network management layer of the network management hierarchy.

16. The site controller of claim 14, wherein said report generation means comprises:

means for determining whether a numerical identifier of the second port is greater than a numerical identifier of the first port if the first port is cross-connected to the second port;

means for determining whether performance data exists for both the first port and the second port if the numerical identifier of the second port is greater than the numerical identifier of the first port; and means for combining the performance data associated with the first port and the performance data associated with the second port into the performance report if performance data exists for both the first port and the second port.

17. The site controller of claim 16, wherein said report generation means further comprises:

means for determining that a report for the first port and the second port has previously been generated if the numerical identifier of the second port is less than the numerical identifier of the first port.

18. The site controller of claim 16, wherein said report generation means further comprises:

means for flagging the performance data received from the network element as being incomplete, and performing an incomplete process to address problems associated with the receipt of incomplete performance data from the network element, if performance data does not exist for both the first port and the second port.

19. The method of claim 1, wherein step (1) comprises the step of receiving said performance data from a digital cross connect.

20. The telecommunications system of claim 9, wherein said network element is a digital cross connect.

21. The site controller of claim 14, wherein the network element is a digital cross connect.

* * * * *